United States Patent
Darras et al.

(10) Patent No.: US 10,633,073 B2
(45) Date of Patent: Apr. 28, 2020

(54) METHOD, DEVICE AND SYSTEM FOR ASSEMBLY OF A PLURALITY OF PANELS

(71) Applicant: Aerolia, Toulouse (FR)

(72) Inventors: Franck Darras, Meaulte (FR); Yannick Wattier, Thiant (FR)

(73) Assignee: AEROLIA, Toulouse (FR)

( * ) Notice: Subject to any disclaimer, the term of this patent is extended or adjusted under 35 U.S.C. 154(b) by 364 days.

(21) Appl. No.: 15/106,530

(22) PCT Filed: Dec. 19, 2014

(86) PCT No.: PCT/EP2014/078639
§ 371 (c)(1),
(2) Date: Jun. 20, 2016

(87) PCT Pub. No.: WO2015/091903
PCT Pub. Date: Jun. 25, 2015

(65) Prior Publication Data
US 2017/0001734 A1 Jan. 5, 2017

(30) Foreign Application Priority Data

Dec. 19, 2013 (FR) ...................................... 13 03001

(51) Int. Cl.
*B64F 5/10* (2017.01)
*B64C 1/12* (2006.01)
(Continued)

(52) U.S. Cl.
CPC .............. *B64C 1/12* (2013.01); *B23K 20/122* (2013.01); *B23K 20/126* (2013.01);
(Continued)

(58) Field of Classification Search
CPC  B23K 20/126; B23K 20/122; B23K 37/0211; B23K 20/12; B23K 33/00;
(Continued)

(56) References Cited

U.S. PATENT DOCUMENTS 4,879,891 A * 11/1989 Hinshaw ............. H01L 21/4878
72/254
5,163,793 A * 11/1992 Martinez .................. B21J 15/10
269/309
(Continued)

FOREIGN PATENT DOCUMENTS

DE  10 2006 055286 A1   5/2008
DE     102006055286    *  5/2008
EP        1736271 A1    12/2006

OTHER PUBLICATIONS

Friction Stir Welding; Airbus A340-500 HGW Vacuum clamping fixture shown in Fig. 4.20, p. 104; T. Zappia, MTS Systems Corporation; copyright 2010.*
(Continued)

*Primary Examiner* — Monica S Carter
*Assistant Examiner* — Mahdi H Nejad
(74) *Attorney, Agent, or Firm* — Klein, O'Neill & Singh, LLP (57) ABSTRACT

The invention relates to a device for assembling a plurality of panels of an aircraft fuselage, said device comprising at least one anvil body, comprising a surface for supporting the said plurality of panels, the said anvil body comprising at least one anvil rail mounted movably in a cavity of the anvil body and configured to move between a top position in which the upper surface of the anvil rail extends into the extension of the support surface and a bottom position in which a workspace is created between the upper surface of the anvil rail and the support surface so as to allow a machining and/or stripping tool to pass through.

21 Claims, 6 Drawing Sheets (51) Int. Cl.
*B23K 20/12* (2006.01)
*B23P 21/00* (2006.01)
*B23P 23/04* (2006.01)

(52) U.S. Cl.
CPC .............. *B23P 21/002* (2013.01); *B23P 23/04* (2013.01); *B64F 5/10* (2017.01); *B23P 2700/01* (2013.01)

(58) Field of Classification Search
CPC ........ B23K 37/08; B64F 5/10; B23P 2700/01; B23P 23/04; B64C 1/12
USPC ... 228/2.1, 112.1, 212–213, 44.3, 47.1, 49.1, 228/49.3
See application file for complete search history.

(56) References Cited

U.S. PATENT DOCUMENTS

| | | | | |
|---|---|---|---|---|
| 5,806,395 | A * | 9/1998 | Dafler | B23K 37/08 83/285 |
| 6,029,352 | A | 2/2000 | Nelson | |
| 6,098,260 | A * | 8/2000 | Sarh | B21J 15/10 227/52 |
| 6,519,823 | B1 * | 2/2003 | Sugata | B23Q 1/015 29/26 A |
| 6,551,428 | B1 * | 4/2003 | Guillou | B23P 19/04 156/152 |
| 6,687,971 | B2 * | 2/2004 | Nakamura | B62D 65/02 29/281.1 |
| 6,835,909 | B2 * | 12/2004 | Nakamura | B62D 65/02 219/86.7 |
| 6,936,332 | B2 * | 8/2005 | Aota | B23K 20/122 228/112.1 |
| 7,469,473 | B2 * | 12/2008 | Savoy | B62D 65/02 269/297 |
| 9,493,201 | B2 * | 11/2016 | Kilibarda | B62D 65/026 |
| 10,035,230 | B2 * | 7/2018 | Buckus | G05B 19/19 |
| 2002/0124377 | A1 * | 9/2002 | Nakamura | B62D 65/02 29/430 |
| 2005/0015962 | A1 * | 1/2005 | Sturm, Jr. | B23Q 1/035 29/468 |
| 2005/0045693 | A1 * | 3/2005 | Buchheit | B23K 20/126 228/112.1 |
| 2009/0224175 | A1 * | 9/2009 | Lee | G01N 21/645 250/459.1 |
| 2010/0006622 | A1 * | 1/2010 | Smith | B23K 20/125 228/2.1 |
| 2011/0127311 | A1 * | 6/2011 | Peterson | B23K 20/126 228/2.1 |
| 2013/0175019 | A1 * | 7/2013 | Phelan | B23K 20/122 165/185 |
| 2014/0210070 | A1 * | 7/2014 | Hori | B23K 20/122 257/712 |
| 2015/0122292 | A1 * | 5/2015 | McDermott | F01D 25/002 134/18 |
| 2016/0008934 | A1 * | 1/2016 | Oberoi | B29C 45/14336 29/428 |
| 2016/0075451 | A1 * | 3/2016 | Hunt | G01B 11/2518 72/16.2 |
| 2017/0001735 | A1 * | 1/2017 | Darras | B23P 19/04 |
| 2017/0369145 | A1 * | 12/2017 | Rajabali | B32B 7/12 |
| 2018/0085977 | A1 * | 3/2018 | Ezaki | B32B 15/08 |
| 2018/0200829 | A1 * | 7/2018 | Campbell | F16B 5/08 |
| 2018/0207745 | A1 * | 7/2018 | Hori | B23K 20/12 |
| 2019/0030588 | A1 * | 1/2019 | Hirai | B64C 1/12 |
| 2019/0127088 | A1 * | 5/2019 | Kasahara | B23P 21/00 |
| 2019/0144134 | A1 * | 5/2019 | Kasahara | B21J 15/142 29/559 |

OTHER PUBLICATIONS

Search Report from FR Intellectual Property Office (INPI) on related FR application (FR1303001) dated Jul. 9, 2014.

* cited by examiner

METHOD, DEVICE AND SYSTEM FOR ASSEMBLY OF A PLURALITY OF PANELS

FIELD OF ART

This invention relates to the field of assembling panels of an aircraft fuselage and relates more particularly to a method and system for assembling a plurality of panels of an aircraft fuselage by welding, particularly the nose section of an aircraft fuselage.

BACKGROUND

The nose section of an aircraft fuselage is fabricated in a known way by the edge-to-edge assembly of a plurality of panels.

To achieve this, the panel edges to be joined are first machined separately, then welded together.

Machining the edges to be joined removes superfluous material resulting from the fabrication of the panels and smooths the edges in order to improve the quality and evenness of the joint between two panels.

As the panels are machined individually one after the other, the edges of two panels to be joined together are not necessarily complementary.

This results in a gap between the panel edges, which is variable along the joint, even more so when the panels are curved. This gap degrades the quality, efficiency and aesthetics of the weld, which represents a first drawback.

Moreover, the method of assembling curved panels can be complex, tedious and time-consuming because it is necessary to machine each panel individually on a machining table, move the panels to a welding table, position them edge to edge and then weld them, which represents a second considerable drawback.

Furthermore, it is not possible with the existing assembly methods to perform at the same time the machining, stripping and welding of a plurality of panels using the same device. In fact, the existing devices do not make it possible to have at the same time, on the same device, a space in which to move a machining and/or stripping tool along the external faces of the panels and a counter-support on the said external faces in order to weld the said panels, which represents a third drawback.

SUMMARY

The aim of the invention is therefore to overcome these drawbacks by proposing a workpiece-holding device for assembling a plurality of panels of an aircraft fuselage that is simple, effective, reliable and quick to implement.

To this end, the invention relates to a device for assembling a plurality of panels of an aircraft fuselage, said device comprising at least one anvil body comprising a surface for supporting the said plurality of panels, the said anvil body comprising at least one anvil rail mounted movably in a cavity of the anvil body and configured to move between a top position in which the upper surface of the anvil rail extends into the extension of the support surface and a bottom position in which a workspace is created between the upper surface of the anvil rail and the support surface so as to allow a machining tool and/or stripping tool to pass through.

The device according to the invention therefore allows, particularly thanks to its movable anvil rail, both a space to be created in which to move a machining and/or stripping tool along the faces of the panels and a counter-support for the said faces in order to weld the said panel edges to be joined.

Thus, the same device can advantageously be used both to machine and/or strip the panel edges to be joined and to weld them without the need to handle them once they have been positioned on the device.

Moreover, such a device allows several panels to be machined or welded simultaneously, which makes their assembly both easier and quicker.

In a preferred embodiment of the device according to the invention, the anvil body comprises two anvil rails.

According to a characteristic of the invention, the anvil rail comprises a preferably metal structural beam, extending the entire length of the anvil body.

Preferably, the anvil rail comprises heat dissipation means, preferably mounted on the lower part of the structural beam. These heat dissipation means may, for example, be in the form of a radiator comprising aluminum fins.

Advantageously, the structural beam comprises two ribs to support a first panel and a second panel serving as a robust counter-support for welding their edges and also enabling a tool holder to be guided so that a tool can move along the anvil rail.

Again advantageously, the structural beam comprises a tool holder and a guide bar of said tool holder.

According to a preferred aspect of the invention, the guide bar extends along the length of the structural beam and laterally thereto so as to enable the movement of the tool holder along the structural beam along the length of the edges to be joined.

The tool holder may comprise a deflectometer to control an operation performed by the machining and/or stripping tool along the panel edges to be joined.

According to an aspect of the invention, the device comprises a machining and/or stripping tool mounted in the tool holder of the anvil rail.

The invention also concerns a system for assembling a plurality of panels of an aircraft fuselage comprising a device as described above, at least one first panel and one second panel, and movement means mounted on the anvil body, the said movement means being arranged to move the first panel in relation to the second panel between a first machining position in which one edge of the first panel and one edge of the second panel are spaced a machining distance apart so as to allow a machining tool to pass between the said edges in order to machine them simultaneously and a second welding position in which the said edge of the first panel and the said edge of the second panel are adjacent and resting on the said anvil body.

The machined edges of the first panel and the second panel are more complementary because they have been machined at the same time and by the same tool, which prevents the appearance of too large a gap between the panel edges to be joined and thus enables a weld to be achieved that is both robust and aesthetic.

It will also be noted that, when the panels comprise a coating that must be removed from the edges to be joined in order to allow them to be welded, the movement means are arranged to move the first panel in relation to the second panel into a third stripping position in which one edge of the first panel and one edge of the second panel are spaced apart by a stripping distance to allow the passage of a tool to strip the said coating from the said edges in order to strip them simultaneously.

According to a characteristic of the invention, the movement means comprise a movable support on which the first panel is positioned.

Preferably, the movement means comprise two movable supports to enable the simultaneous assembly of three fuselage panels, for example in order to assemble a bottom part of an aircraft nose section.

Again preferably, the movement means are configured to move the first panel laterally and vertically.

In a preferred way, the means of moving the first panel in relation to the second panel comprise a mechanism for guiding the movable support in relation to a first lateral part of the anvil body.

Advantageously, the movable support comprises means to hold the edge of the said first panel.

According to a characteristic of the invention, the holding means comprise at least one suction table.

According to another characteristic of the invention, the first panel is curved.

According to an aspect of the invention, the anvil body has an upper support surface with a curved shape so as to marry up with the shape of an aircraft nose section.

Advantageously, the system comprises means for positioning the panels so as to increase the precision and quality of assembly.

These positioning means may, for example, be in the form of a plurality of complementary pins and holes.

According to a characteristic of the invention, the positioning means are mounted on the movable support or supports.

According to another characteristic of the invention, the anvil body comprises positioning means.

In a preferred embodiment, the system comprises means to hold the first panel and the second panel.

Preferably, the holding means comprise a plurality of suction cups, preferably located both on the anvil body and on the movable support or supports and arranged to hold the first panel and the second panel.

Again preferably, the holding means comprise at least one suction table, each of which is arranged to receive one panel edge to be joined.

According to a preferred aspect, the anvil body comprises two suction tables.

According to a characteristic of the invention, the suction table or tables comprise heat dissipation means, for example a radiator comprising aluminum fins.

In the machining position, the edges of two panels to be joined are spaced apart at a machining distance of preferably between 0 and 5 mm.

In the stripping position, the edges of two panels to be joined are spaced apart at a stripping distance of preferably between 0 and 1 mm.

In the welding position, the edges of two panels to be joined are arranged edge to edge, with a gap between said edges of less than 0.5 mm.

The invention also concerns a method for assembling a plurality of panels of an aircraft fuselage, implemented in particular by a system as described above, enabling the said panels to be connected in pairs by one of their edges, the said method being remarkable in that it comprises a step of positioning a first panel and a second panel so that their edges to be joined are arranged opposite each other and separated by a machining distance, a machining step of the said edges simultaneously by means of a machining tool passing between the said edges, a step of positioning the first panel and the second panel edge to edge in a welding position and a step of welding the edges of the first panel and the second panel.

When the first panel and the second panel have been positioned edge to edge during the preliminary positioning step, the method comprises a step of spacing the first panel and the second panel apart so as to create the machining distance.

Preferably, friction stir welding is adopted.

Advantageously, the method comprises, preferably after the machining step, a step of stripping the edges of the first panel and second panel to be joined so as to remove at least partially a coating applied to the said edges.

In one mode of implementing the method according to the invention, machining and/or stripping are performed from beneath the panels.

Advantageously, the method comprises a step of checking an operation performed by a tool on the panel edges to be joined, preferably checking the quality of stripping said edges.

BRIEF DESCRIPTION OF THE DRAWINGS

Further features and advantages of the invention will appear from the following description provided in relation to the accompanying drawings given by way of non-limiting examples and in which, identical reference numerals are given to similar items.

DETAILED DESCRIPTION

The system according to the invention comprises an assembly device on which is arranged a plurality of panels to be assembled.

1) Device 1

FIGS. 1 to 10 describe a preferred embodiment of the device according to the invention that enables the simultaneous assembly of three panels 2, 3 and 4 of an aircraft fuselage, in particular, a central panel 3, a first side panel 2 and a second side panel 4.

To this end and according to the invention, device 1 comprises an anvil body 10, first movement means mounted on the said anvil body 10 and adapted to move the first side panel 2 relative to the central panel 3 and second movement means mounted on the said anvil body 10 and adapted to move the second side panel 2 relative to the central panel 3.

Hereinafter, the assembly system means the assembly device 1 equipped with its panels 2, 3 and 4.

a) Anvil Body 10

Figure 1:
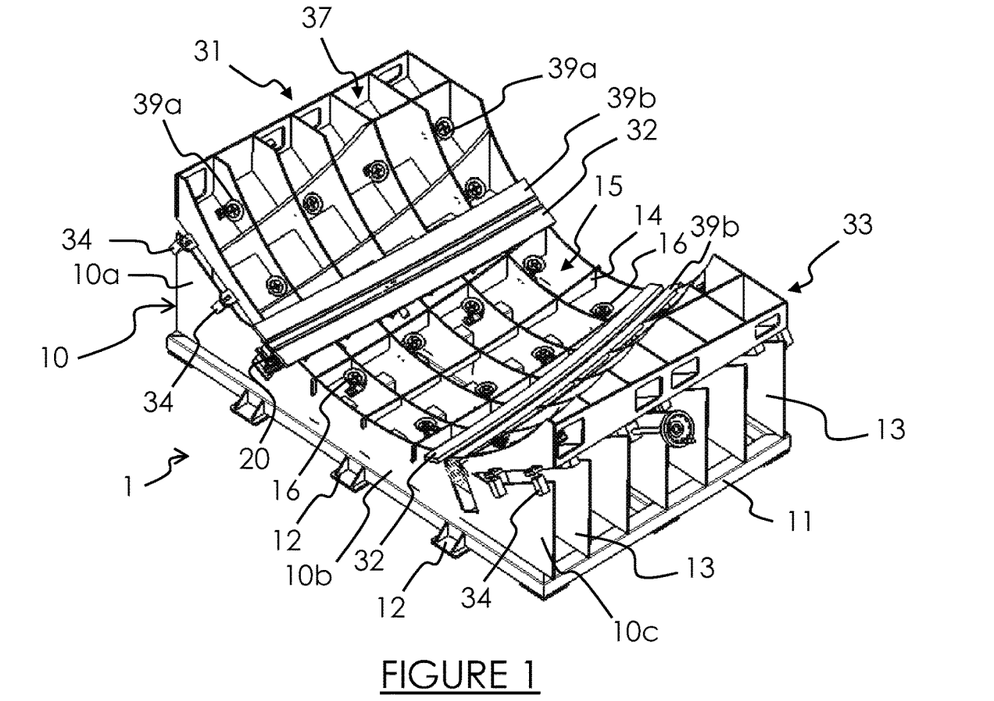
FIG. 1 shows an embodiment of the device according to the invention when empty.
Figure 2:
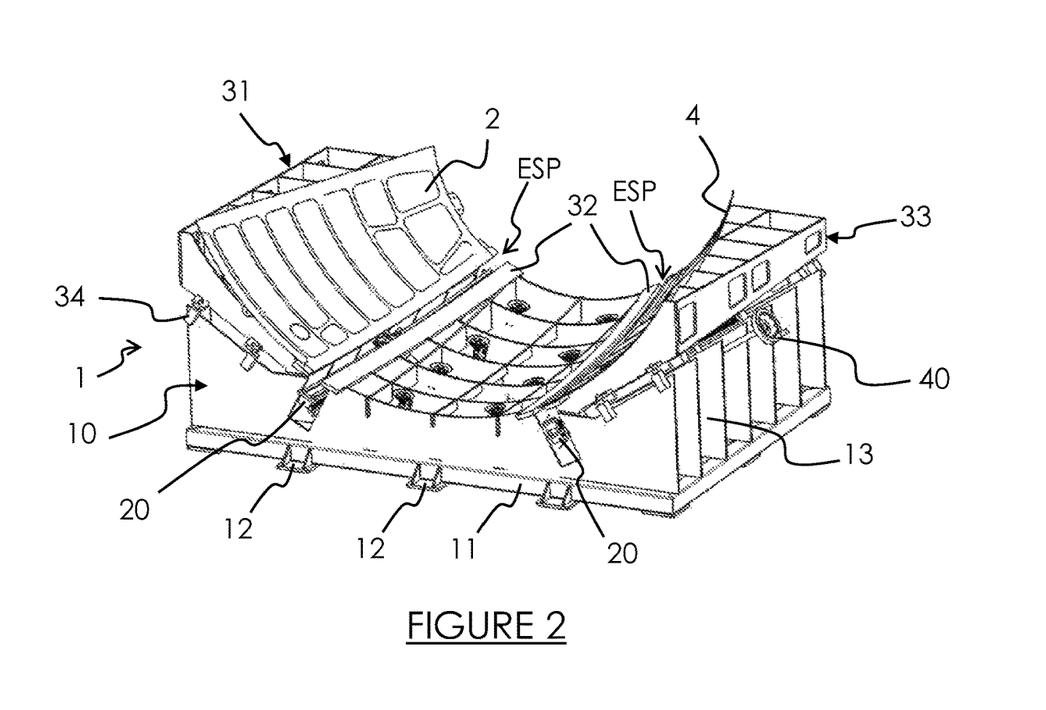
FIG. 2 shows the device in FIG. 1 on which are arranged two side panels.

In this example, as shown in particular in FIG. 1, the anvil body 10 is in the form of a structural framework comprising a rectangular base 11 resting on reinforcements 12 and on which is mounted a plurality of vertical stiffeners 13, arranged in parallel and connected together by horizontal stiffeners 14, thus defining a plurality of chambers 15.

The anvil body 10 has an upper support surface that is curved in shape so as to marry up with the shape of an aircraft nose section but clearly the shape of the support surface could be different, depending on the intended use of the panels to be assembled.

With reference to FIG. 1, the anvil body 10 comprises a central part 10b and two side parts 10a and 10c to support the central panel 3 and side panels 2, 4 respectively.

A plurality of suction cups 16 is arranged in the chambers 15 of the central part of the anvil body 10 so as to hold the central panel 3 fixed in relation to the anvil body 10. Furthermore, in order to position the central panel 3 on the device 1, the anvil body 10 comprises means for positioning said panel 3 in a pre-determined position in order to carry out the steps of machining and welding.

Figure 3:
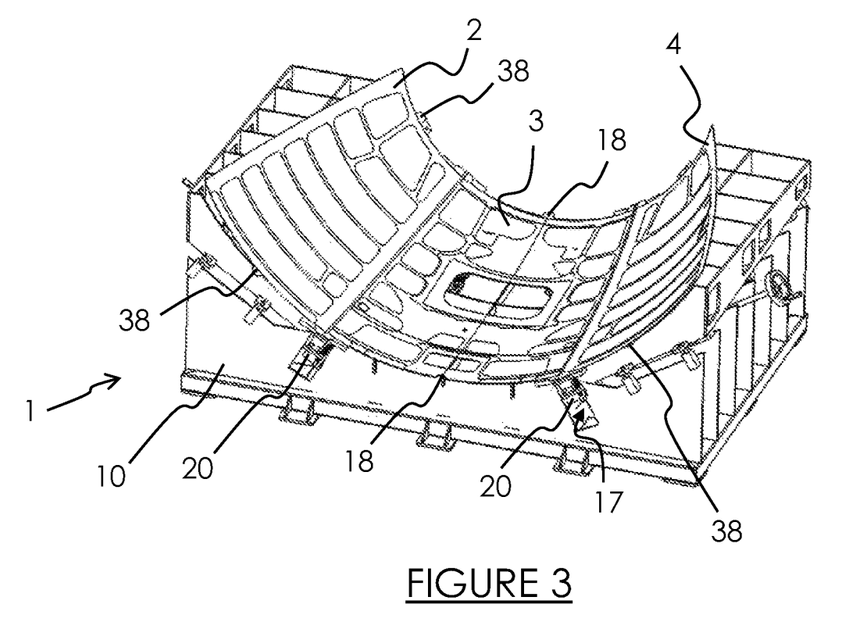
FIG. 3 shows the device in FIG. 1 on which are arranged two side panels and a central panel.

In this example, these positioning means are in the form of pins 18 configured to be received respectively in holes formed in the central panel 3 so as to hold the latter in the predetermined position fixed in relation to the anvil body 10 as shown in FIG. 3.

Figure 4:
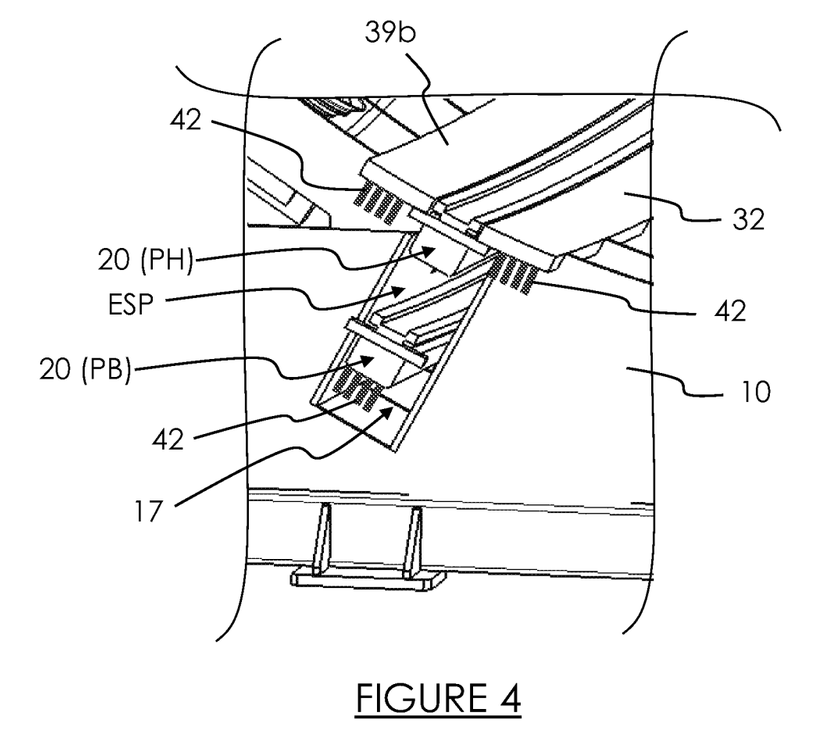
FIG. 4 shows an anvil rail of the device in Figure in the top position and bottom position.
Figure 5:
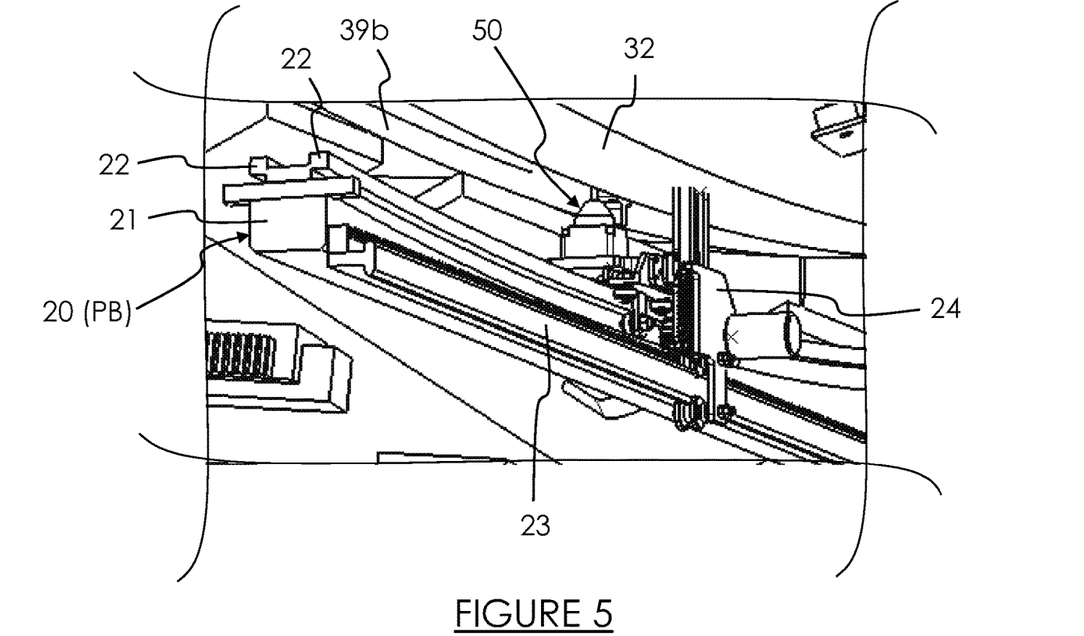
FIGS. 5 to 8 are perspective views of an anvil rail on which a tool is arranged.
Figure 6:
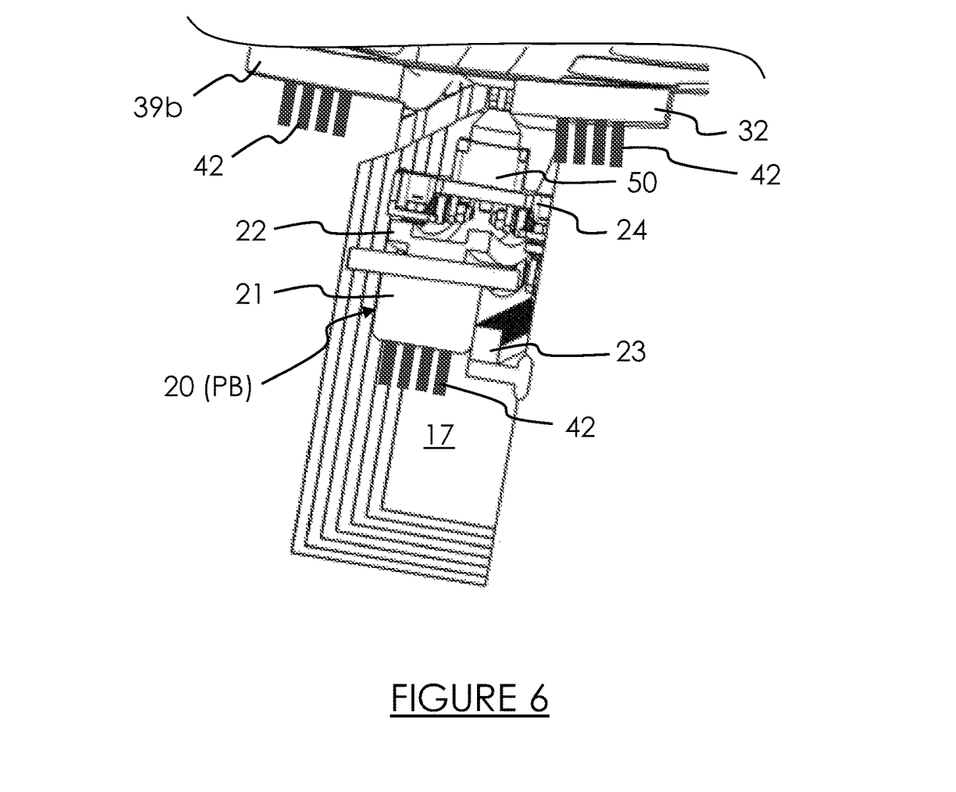
Figure 7:
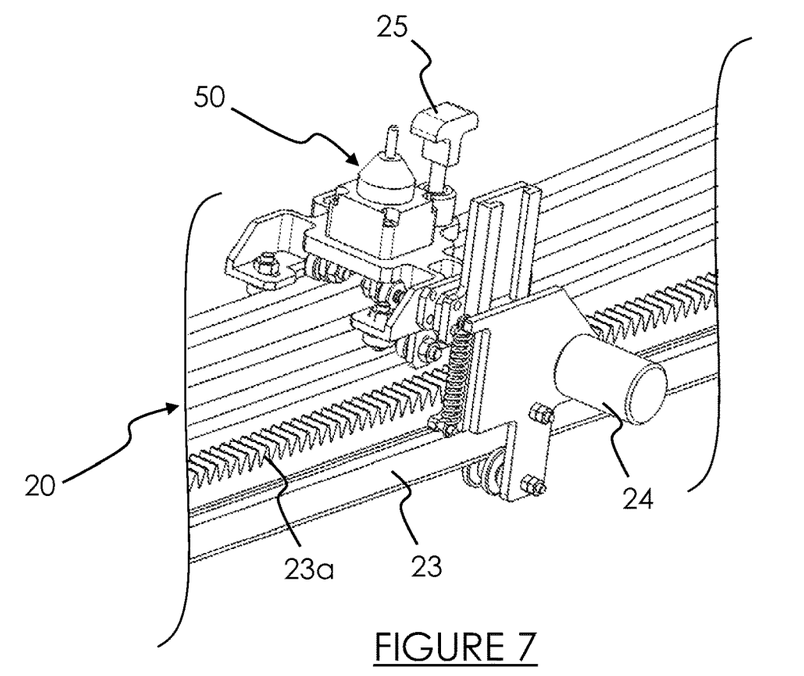
Figure 8:
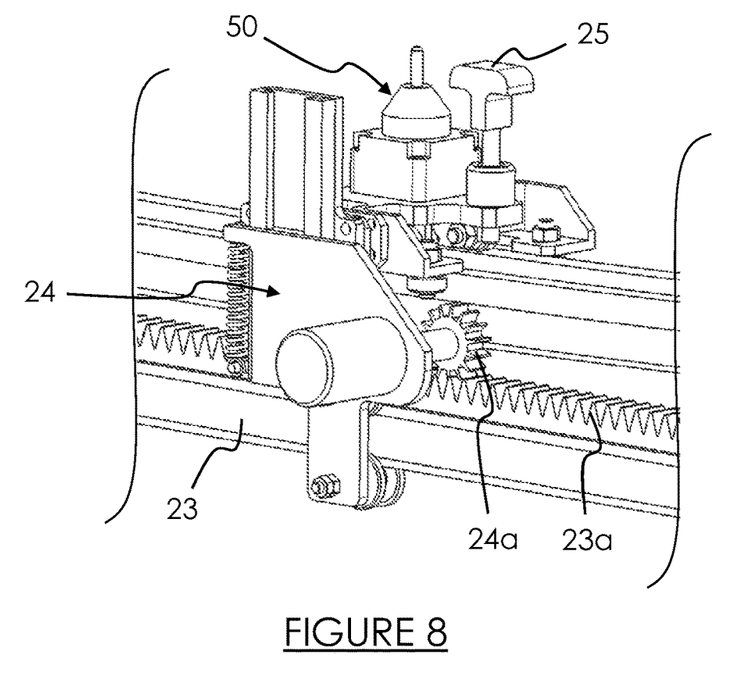

In this example, the anvil body 10 comprises two anvil rails 20 mounted movably in two cavities 17 of the anvil body 10 respectively (see FIGS. 3, 4 and 6). Each anvil rail 20 is configured to move between a top position PH, shown in FIGS. 4 to 6, in which the upper surface of the anvil rail 20 extends into the extension of the support surface of the anvil body 10, and a bottom position PB, shown in FIG. 4, in which a workspace ESP (see FIGS. 2 and 4) is created between the upper surface of the anvil rail 20 and the support surface of the anvil body 10. As will be described later, this workspace ESP allows a machining tool and/or stripping tool 50 to pass through, as shown in FIGS. 5 and 6.

An anvil rail 20 will now be described in detail with reference to FIGS. 5 to 8. The anvil rail 20 comprises a preferably metal structural beam 21 extending along the entire length of the anvil body 10. In this embodiment, the structural beam 21 is long and curved so as to extend into the extension of the support surface of the anvil body 10 in the welding position. As shown in FIG. 5, the structural beam 21 comprises two ribs 22 to support the panels 2, 3 and 4 and a guide bar 23 for a tool holder 24.

The structural beam 21 is sized in order to withstand the stress of pressure welding, friction stir welding in particular, of panels 2, 3 and 4.

The guide bar 23 extends along the length of the structural beam 21 and laterally thereto as shown in FIG. 5. The guide bar 23 comprises a toothed surface 23a adapted to cooperate with a toothed wheel 24a of a tool holder 24 so as to form a rack and pinion system enabling the tool carrier 24 to be moved along the structural beam 21 in order to machine, strip and/or weld panels 2, 3 and 4 with the aid of a machining tool and/or stripping tool 50 mounted on the tool holder 24.

The tool holder 24 is preferably driven by drive means (not shown) comprising for example a motor adapted to drive the toothed wheel 24a in rotation. Thus an operator need only operate the said motor in order to change the position of the tool holder 24 on the anvil rail 20.

The tool holder 24 also comprises a deflectometer 25 so as to control an operation performed by the tool 50 on the edges of panels 2, 3 and 4, particularly to check the quality of a stripping operation.

As a variation, the anvil body can be in one piece so as to provide a continuous upper support surface. In other words, the anvil body can have no cavities 17 or anvil rails 20.

The purpose of the anvil body 10 is to constitute a single positioning reference for panels 2, 3 and 4 during their various stages of assembly in order to guarantee an accurate assembly.

In this example, the anvil body 10 comprises a module for positioning the central panel 3, which takes the form of two suction tables 32 adapted to lock the central panel 3 in position. A suction table, well known to a person skilled in the art, allows a surface of an object to be suctioned in order to hold it flat against said table so as to be able to work it, for example in order to machine, strip or weld it. As shown in particular in FIGS. 1 and 2, each suction table 32 in this embodiment is in the form of a runner of a length at least equal to that of the panel to be held in place and marrying up with the shape thereof.

b) Movement Means

The first means for moving the first side panel 2 in relation to the central panel 3 comprise a first support 31 capable of receiving the first side panel 2 and a mechanism 34 for guiding the first support 31 in relation to a first side part 10a of the anvil body 10.

Similarly, the two means for moving the second side panel 4 in relation to the central panel 3 comprise a second support 33 capable of receiving the second side panel 4 and a mechanism 34 for guiding the second support 33 in relation to a second side part 10c of the anvil body 10.

The two movable side panel supports 31 and 33 are each in the form of a curved structural framework, whereas the guide mechanisms 34 comprise a series of rails and grooves enabling the supports 31, 33 to slide in relation the anvil body 10. Preferably, each guide mechanism 34 comprises an endless screw to adjust the slide and an operating wheel 40 designed to be manipulated by an operator (not shown) in order to drive the said endless screw in rotation. Clearly, other guide mechanisms could also be used (rack and pinion, actuator, etc.). Clearly, the operation of the movement can be manual or motorized.

The framework of supports 31, 33 is similar to that of the anvil body 10 and thus defines a plurality of chambers 37.

Figure 9:
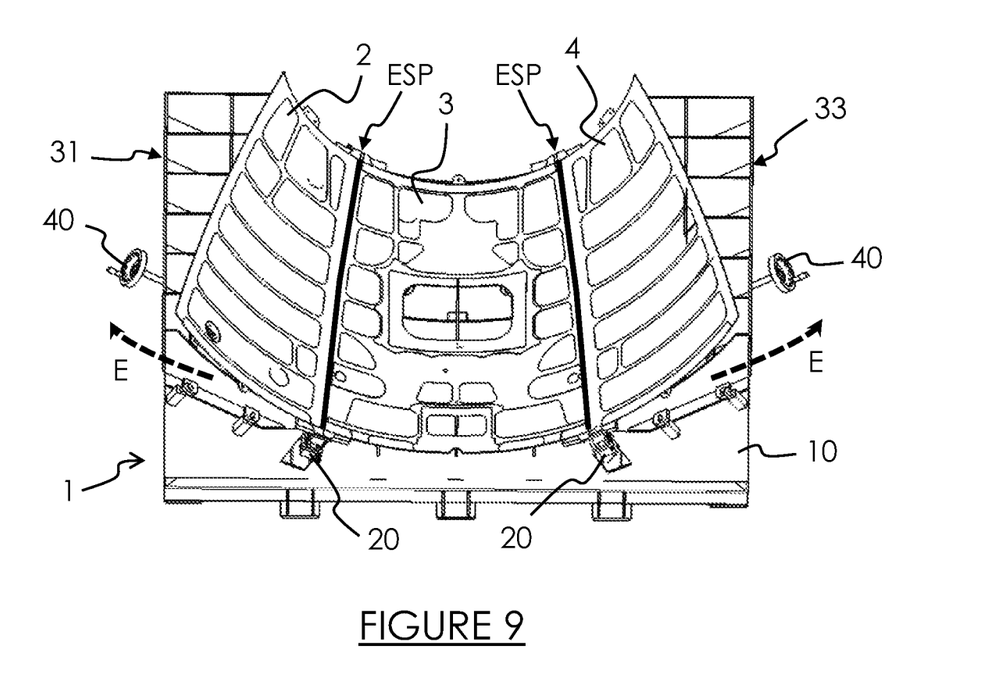
FIG. 9 shows the device in FIG. 3 in the machining position.
Figure 10:
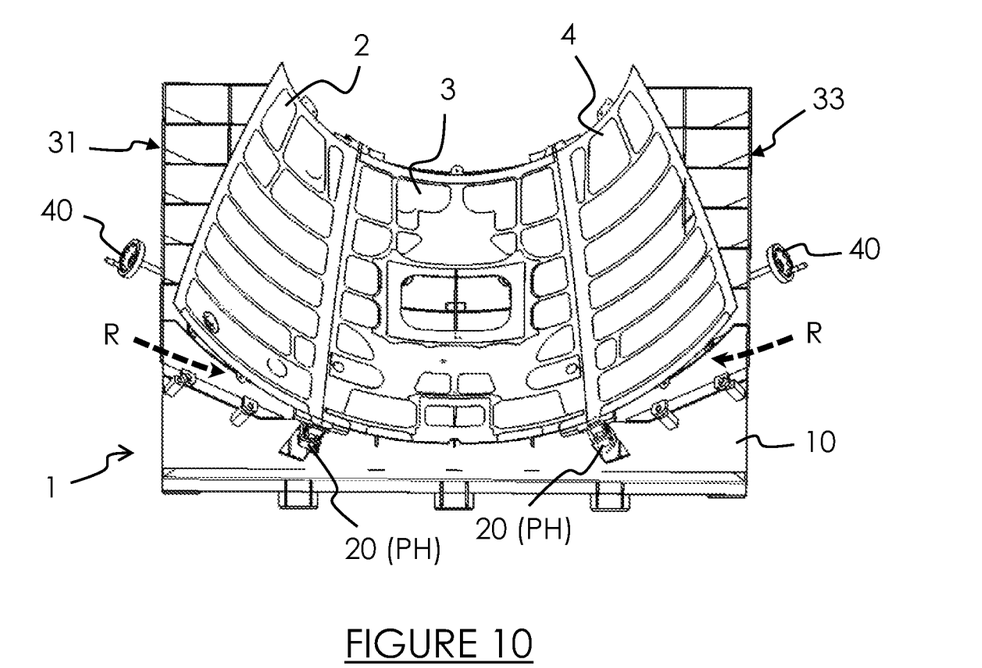
FIG. 10 shows the device in FIG. 3 in the welding position, and FIG. 11 describes a preferred way of implementing the method according to the invention.

Thanks to the first movement means and second movement means, the side panels 2, 4 are arranged to move between a machining position shown in FIG. 9, and a welding position, shown in FIG. 10.

In the machining position, a machining distance exists between each side panel 2, 4 and the fixed central panel 3 so that each pair of edges to be joined of panels (2, 3) and (3, 4) can be machined simultaneously with the same machining tool.

The machining position can also correspond to a stripping position in which a coating applied to panels 2, 3 and 4 can be removed with the aid of a stripping tool.

In the welding position, the movable panel supports 31 and 33 are moved so that the edges of panels (2, 3) and (3, 4) are adjacent in pairs so as to be able to be welded together with a welding tool.

In order to position the side panels 2, 4 on the supports 31, 33, the latter comprise means for positioning panels 2 and 4 in a predetermined position in order to perform the machining and welding steps. As shown in FIG. 3, in this example these positioning means are in the form of a plurality of pins 38 configured to be received respectively in holes formed in side panels 2, 4 so as to hold them in the predetermined position on the supports 31, 33. Preferably, as shown in FIG.

1, the supports 31, 33 each comprise a plurality of suction cups 39a enabling the side panels 2, 4 to be held stable during assembly.

Each of the supports 31, 33 comprises a suction table 39b arranged parallel to the suction table 32 designed to hold the central panel 3 so as to receive and support the edges to be joined of side panels 2, 4 arranged on the supports 31, 33.

Lastly, note that the suction tables 32 and 39b, as well as the structural beam 21, comprise means to dissipate heat, in particular the heat from a friction stir weld.

As shown in FIGS. 4 and 6, these heat dissipation means take the form of radiators 42 comprising a plurality of preferably aluminum heat-dissipating fins mounted on the lower part of suction tables 32 and 39b respectively of the structural beam 21.

2) Implementation

Figure 11:
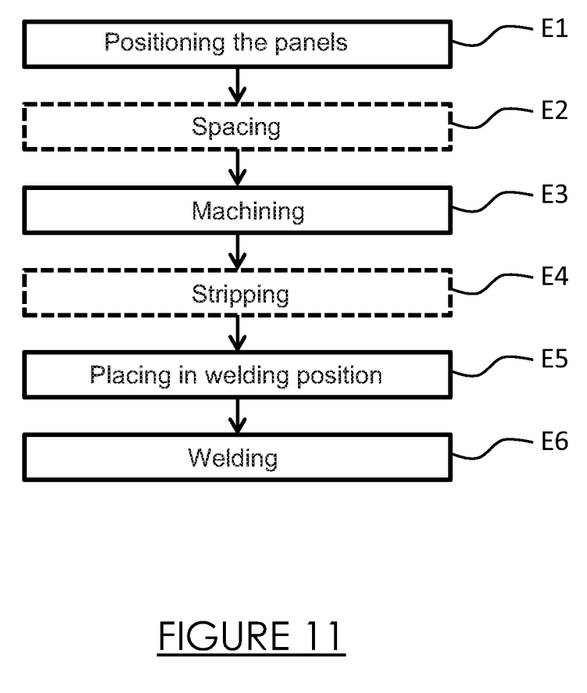

The assembly of panels 2, 3 and 4 comprises a plurality of steps, described below with particular reference to FIG. 11, enabling them to be connected together in pairs by at least one of their edges.

a) Positioning Panels 2, 3 and 4 on Device 1

In order to increase the quality and precision of assembly, the method firstly comprises a first step E1 of positioning the central panel on its positioning module 32 and the side panels 2, 4 on their movable supports 31, 33 with the aid of positioning means 18, 38 so that the edges to be joined are in contact with each other.

Each panel 2, 3 and 4 is held flat by the combined action of the plurality of suction cups 16, 39a and suction tables 32, 39b.

Preferably, the side panels 2, 4 are positioned adjacent in pairs in relation to the central panel 3 when they are positioned on their movable supports 31, 33.

In order to proceed with the machining, also called "trimming", of the edges to be joined, the movable supports 31, 33 are firstly spaced a machining distance away from the central fixed panel 3 in a spacing step E2, shown by E in FIG. 9. The spacing is defined so that the machining distance allows a machining tool to pass between the said edges to enable them to be machined simultaneously. In this example, the machining distance between the said edges to be joined is between 0 and 5 mm.

As a variation, the side panels 2, 4 can be positioned directly in the spaced apart machining position of the central panel 3.

b) Machining the Edges to be Joined

The edges of panels 2, 3 and 4 are machined in step E3.

In this example of implementation, the machining tool is in the form of a rotary cutter with a diameter in the order of 6 mm.

In a first embodiment, the anvil rails 20 are placed in a bottom position PB and the panel edges to be joined are machined by a machining tool (not shown) moving above panels 2, 3 and 4 (for example being fixed to the end of a robotic arm or on a gantry).

In a second embodiment, the anvil rails 20 are also placed in a bottom position PB and a machining tool 50 is fixed to the tool holder 24 of each anvil rail 20 in order to machine the edges.

c) Stripping the edges

When panels 2, 3, 4 comprise a coating on their under surfaces (in the position of panels 2, 3 and 4 on device 1), this coating must be removed at the edges to be joined in order to improve the quality of welding of said edges.

To do this, the anvil rails 20 are placed in the bottom position PB, a stripping tool 50 is mounted in the tool holder 24 and the edges to be joined are brought towards each other, if necessary, in a stripping position in which they are spaced apart at a distance of between 0 and 1 mm in order to achieve said stripping in a step E4.

If machining has previously been performed by a machining tool mounted on the tool holder 24 of the anvil rail 20 in the bottom position PB, the machining tool is first removed from the tool holder 24 then a stripping tool 50 is mounted in the tool holder 24.

The quality of stripping is checked during the stripping step by the deflectometer 25 mounted on the tool holder 24. A fault detected by the deflectometer 25 can be rectified by the stripping tool 50.

d) Welding

Since the two edges to be joined have been machined simultaneously by the assembly system 1, the said edges have a complementary shape so that the gap between the edges is advantageously very small, less than 0.5 mm, when they are positioned edge to edge.

Once machined and optionally stripped, the side panels 2 and 4 and the central panel 3 are then positioned edge to edge in a welding position in an alignment step E5, shown in FIG. 10 as R, so that the distance between the edges to be joined is less than 0.5 mm.

If the edges to be joined have not been stripped, they are aligned in pairs by moving the movable supports 31 and 33 from the machining position to the welding position.

Before welding panels 2, 3 and 4 in a step E6, the anvil rails 20 are placed in the top position so as to form an effective and firm counter-support for panels 2, 3 and 4 during welding, particularly in the case of friction stir welding.

Welding is preferably achieved using the friction stir technique but clearly any other welding technique can be used.

Once the panels are arranged edge to edge and supported on the ribs 22 of the anvil rails 20 in the top position PH, panels 2, 3 and 4 are welded, preferably and advantageously simultaneously using two welding tools.

The device and method according to the invention therefore advantageously allow several panels to be machined simultaneously.

More particularly, the use of one tool to machine the edges of two panels to be welded together allows them advantageously to be made complementary and considerably reduces the gap between said panels, which makes welding both robust and aesthetic.

Moreover, the machining and welding of the three panels is thus advantageously very fast since it is achieved on the same assembly device 1 with no need to handle panels 2, 3 and 4 manually.

Note also that the assembly system 1 according to the invention advantageously allows a machining, stripping and welding process to be performed simultaneously for each pair of panels (2, 3) and (3, 4) that are to be assembled.

Preferably, machining and welding are performed by a tool moving above panels 2, 3 and 4 and stripping, if necessary, is performed by a tool 50 moving along the anvil rail 20 below the panels positioned on the device 1.

Note that the present invention is not limited to the examples described above and that numerous variations are possible, accessible to a person skilled in the art.

In particular, the shapes, nature, dimensions and characteristics in terms of material of the anvil body 10, anvil rail 20 and supports 31, 33 as shown in the Figures to illustrate an embodiment of the invention, cannot be interpreted as limiting.

The invention claimed is:

1. A device for assembling a plurality of panels of an aircraft fuselage comprising:
   at least one anvil body comprising a support surface supporting the plurality of panels; and
   at least one anvil rail movably mounted in a cavity of the at least one anvil body and moving between:
      a top position, in which an upper surface of the at least one anvil rail extends into an extension of the support surface to form a counter-support supporting at least two of the plurality of panels, and
      a bottom position, in which a workspace is created between the upper surface of the at least one anvil rail and the support surface so as to enable passage of a tool that strips a coating from edge of at least two of the plurality of panels simultaneously,
   wherein the at least one anvil rail comprises:
      a structural beam,
      a tool holder to hold the tool, and
      a guide bar,
         wherein the structural beam extends along an entire length of the at least one anvil body, and
         wherein the guide bar is sized and shaped to guide the tool holder in the cavity.

2. The device according to claim 1, wherein the at least one anvil rail further comprises a heat dissipater.

3. The device according to claim 2, wherein the heat dissipater is mounted on a lower part of the structural beam.

4. The device according to claim 2, wherein the heat dissipater comprises a radiator comprising aluminum fins.

5. The device according to claim 1, wherein the structural beam comprises two ribs to support a first panel and a second panel of the plurality of panels serving as a robust counter-support for welding edges and also enables the tool holder to be guided so that the tool can move along the at least one anvil rail.

6. The device according to the claim 1, wherein the guide bar extends along a length of the structural beam and laterally thereto so as to enable a movement of the tool holder along the structural beam along a length of edges of the panels to be joined.

7. The device according to claim 1, wherein the tool holder comprises a deflectometer to control an operation performed by the tool mounted in the said tool holder.

8. The device according to claim 1, wherein the tool comprises a machining tool or a stripping tool mounted on the tool holder of the at least one anvil rail.

9. The device according to claim 1, wherein a movable support comprises pins to engage with holes of at least one first panel and at least one second panel of the plurality of panels.

10. A system for assembling a plurality of panels of an aircraft fuselage, the plurality of panels comprising at least one first panel and at least one second panel, the system comprising:
   at least one anvil body comprising a support surface supporting the plurality of panels;
   at least one anvil rail movably mounted in a cavity of the at least one anvil body and moving between:
      a top position, in which an upper surface of the at least one anvil rail extends into an extension of the support surface to form a counter-support for a first face of the at least one first panel and a second face of the at least one second panel during friction stir welding, and
      a bottom position, in which a workspace is created between the upper surface of the at least one anvil rail and the support surface so as to enable a passage of a stripping or machining tool,
   wherein the at least one anvil rail further comprises:
      a structural beam,
      a tool holder comprising the stripping or machining tool, and
      a guide bar,
         wherein the structural beam extends along an entire length of the at least one anvil body, and
         wherein the guide bar is sized and shaped to guide the tool holder in the cavity; and
   a mover mounted on the at least one anvil body,
      wherein the mover is arranged to move the at least one first panel in relation to the at least one second panel between:
         a first machining position, wherein an edge of the at least one first panel and an edge of the at least one second panel are spaced a machining distance apart to allow the stripping or machining tool to pass between the edges of the at least one first panel and the at least one second panel to simultaneously strip or machine both the edge of the at least one first panel and the edge of the at least one second panel, and
         a second welding position, wherein the edge of the at least one first panel and the edge of the at least one second panel are adjacent and resting on the at least one anvil body.

11. The system according to claim 10, wherein the mover comprises a movable support, on which is positioned the at least one first panel, and comprises a mechanism for guiding the movable support in relation to a first lateral part of the at least one anvil body.

12. The system according to claim 11, wherein the at least one anvil body has an upper support surface with a curved shape so as to marry up with a shape of an aircraft nose section.

13. The system according to claim 11, further comprising a positioner for positioning the at least one first panel and the at least one second panel.

14. The system according to claim 11, wherein the positioner comprises pins mounted on the movable support to engage with holes of the at least one first panel and the at least one second panel.

15. The system according to claim 10, further comprising a holder to hold the at least one first panel and the at least one second panel, comprising at least one suction table arranged to receive an edge of a panel of the plurality of panels to be joined.

16. The system according to claim 15, wherein the at least one suction table comprises a heat dissipater.

17. The system according to claim 10, wherein the tool comprises a machining tool mounted on the tool holder of the at least one anvil rail.

18. The system according to claim 10, wherein the at least one anvil rail further comprises a radiator comprising aluminum fins to dissipate heat.

19. The system according to claim 18, wherein the radiator is mounted on a lower part of the structural beam.

20. The system according to claim 10, wherein the tool holder comprises a deflectometer to control an operation performed by the stripping or machining tool mounted in the said tool holder.

21. The system according to claim 10, wherein the structural beam is sized to withstand the stress of the friction stir welding when forming the counter-support for the first face of the at least one first panel and the second face of the at least one second panel during the friction stir welding.

\* \* \* \* \*